United States Patent
Huston, III et al.

(10) Patent No.: US 11,895,158 B2
(45) Date of Patent: Feb. 6, 2024

(54) CYBERSECURITY SYSTEM HAVING SECURITY POLICY VISUALIZATION

(71) Applicant: Forcepoint, LLC, Austin, TX (US)

(72) Inventors: Lawrence Bruce Huston, III, Ann Arbor, MI (US); David Coffey, Austin, TX (US); Andrew Mortensen, Ann Arbor, MI (US)

(73) Assignee: Forcepoint LLC, Austin, TX (US)

( * ) Notice: Subject to any disclaimer, the term of this patent is extended or adjusted under 35 U.S.C. 154(b) by 719 days.

(21) Appl. No.: 16/878,124

(22) Filed: May 19, 2020

(65) Prior Publication Data

US 2021/0367979 A1    Nov. 25, 2021

(51) Int. Cl.
*H04L 9/40*    (2022.01)
*G06F 3/0482*    (2013.01)
(Continued)

(52) U.S. Cl.
CPC .......... *H04L 63/205* (2013.01); *G06F 3/0482* (2013.01); *G06N 5/025* (2013.01); *H04L 47/20* (2013.01)

(58) Field of Classification Search
CPC . H04L 47/20–25; H04L 63/20; H04L 63/205; G06F 3/0482–04855; G06N 5/02–027
See application file for complete search history.

(56) References Cited

U.S. PATENT DOCUMENTS 6,072,875 A    6/2000  Tsudik
6,678,693 B1    1/2004  Shiraishi
(Continued)

FOREIGN PATENT DOCUMENTS

WO    2019153581 A1    8/2019
WO    WO-2019153581 A1    8/2019

OTHER PUBLICATIONS

Barrere et al., Vulnerability Assessment in Autonomic Networks and Services: A Survey, IEEE, Aug. 30, 2013. vol. 16, issue. 2, pp. 988-1004.

(Continued)

*Primary Examiner* — Michael Thier
*Assistant Examiner* — Prince A Mensah
(74) *Attorney, Agent, or Firm* — Terrile, Cannatti & Chambers, LLP; Stephen A. Terrile

(57)    ABSTRACT

A system, method, and computer-readable medium are disclosed for implementing a cybersecurity system having security policy visualization. At least one embodiment is directed to a computer-implemented method for implementing security policies in a secured network, including: retrieving a set of rules of a security policy; analyzing the set of rules of the security policy using one or more Satisfiability Modulo Theory (SMT) operations to reduce a dimensionality of the security policy; and generating a visual presentation on a user interface using results of the SMT operations, where the visual presentation includes visual indicia representing one or more targeted policy dimensions with respect to one or more fixed policy dimensions. In at least one embodiment, two or more security policies are presented with visual indicia representing differences between the security policies, including representations of one or more targeted policy dimensions with respect to one or more fixed policy dimensions.

20 Claims, 6 Drawing Sheets

(51) Int. Cl.
*H04L 47/20* (2022.01)
*G06N 5/025* (2023.01)

(56) References Cited

U.S. PATENT DOCUMENTS

| | | |
|---|---|---|
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0100498 A1* | 4/2009 | Grossi ............... G06Q 10/10 726/1 |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0115654 A1* | 4/2014 | Rogers ................ H04L 63/20 726/1 |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |

(56) References Cited

U.S. PATENT DOCUMENTS

| | | |
|---|---|---|
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0077182 A1* | 3/2018 | Sartran .............. H04L 43/12 |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0007418 A1* | 1/2019 | Cook .................. H04N 21/443 |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanasamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0334025 A1 | 10/2020 | Wang et al. |
| 2020/0387497 A1* | 12/2020 | Chittimalli ............. G06Q 10/10 |

OTHER PUBLICATIONS

Burns et al., Automatic Management of Network Security Policy, IEEE, Jun. 14, 2001, pp. 12-26.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Sean Barnum, Standardized Cyber Threat Intelligence Information with the Structured Threat Information eXpression (STIX) Whitepaper v1.1 (Feb. 20, 2014).

(56) References Cited

OTHER PUBLICATIONS

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Mesaros et al., Latent Semantic Analysis in Sound Event Detection, 19th European Signal Processing Conference (EUSIPCO 2011), pp. 1307-1311.

Marinescu, Dan C., Cloud Computing and Computer Clouds, University of Central Florida, 2012, pp. 1-246.

Sanjeev Goyal et al., Attack, Defence and Contagion in Networks, the Review of Economic Studies, vol. 81, Issue 4, Oct. 2014, pp. 1518-1542, https://doi.org/10.1093/restud/rdu013 (2014).

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Singh et al., Container-Based Microservice Architecture for Cloud Applications, International Conference on Computing, Communication and Automation (ICCCA2017), 2017.

\* cited by examiner

CYBERSECURITY SYSTEM HAVING SECURITY POLICY VISUALIZATION

BACKGROUND OF THE INVENTION

Field of the Invention

The present disclosure relates in general to the field of computers and similar technologies, and in particular to cybersecurity systems utilized in this field. Still more particularly, the disclosure relates to a method, system, and computer-usable medium for implementing a user interface providing visualization of security policies.

Description of the Related Art

Users interact with physical, system, data, and services resources of all kinds, as well as each other, on a daily basis. Each of these interactions, whether accidental or intended, poses some degree of security risk. As an example, security risks are present anytime two or more devices communicate with one another over, for example, the Internet.

Secured networks often automatically execute programmed IT Security Policies to deal with potential security risks. An IT security policy may be used to implement the rules and procedures for all individuals accessing and using an organization's IT assets and resources.

SUMMARY OF THE INVENTION

A system of one or more computers can be configured to perform particular operations or actions by virtue of having software, firmware, hardware, or a combination of them installed on the system that in operation causes or cause the system to implement a cybersecurity system having security policy visualization. One general aspect of the disclosure is directed to a computer-implemented method for implementing security policies in a secured network, including: retrieving a set of rules of a security policy; analyzing the set of rules of the security policy using one or more Satisfiability Modulo Theory (SMT) operations to reduce a dimensionality of the security policy; and generating a visual presentation on a user interface using results of the SMT operations, where the visual presentation includes visual indicia representing one or more targeted policy dimensions with respect to one or more fixed policy dimensions. In at least one embodiment, two or more security policies are presented with visual indicia representing differences between the security policies, including representations of one or more targeted policy dimensions with respect to one or more fixed policy dimensions. Other embodiments of this aspect include corresponding computer systems, apparatus, and computer programs recorded on one or more computer storage devices, each configured to perform the actions of the methods.

Another general aspect of the disclosure is directed to a system including one or more information handling systems, where the one or more information handling systems include: a processor; a data bus coupled to the processor; and a non-transitory, computer-readable storage medium embodying computer program code, the non-transitory, computer-readable storage medium being coupled to the data bus; where the computer program code included in one or more of the information handling systems is executable by the processor of the information handling system so that the information handling system, alone or in combination with other information handling systems, executes operations that may include: retrieving a set of rules of a security policy; analyzing the set of rules of the security policy using one or more Satisfiability Modulo Theory (SMT) operations to reduce a dimensionality of the security policy; and generating a visual presentation on a user interface using results of the SMT operations, where the visual presentation includes visual indicia representing one or more targeted policy dimensions with respect to one or more fixed policy dimensions.

Another general aspect of the disclosure is directed to a non-transitory, computer-readable storage medium embodying computer program code, the computer program code may include computer-executable instructions configured for: retrieving a set of rules of a security policy; analyzing the set of rules of the security policy using one or more Satisfiability Modulo Theory (SMT) operations to reduce a dimensionality of the security policy; and generating a visual presentation on a user interface using results of the SMT operations, where the visual presentation includes visual indicia representing one or more targeted policy dimensions with respect to one or more fixed policy dimensions.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
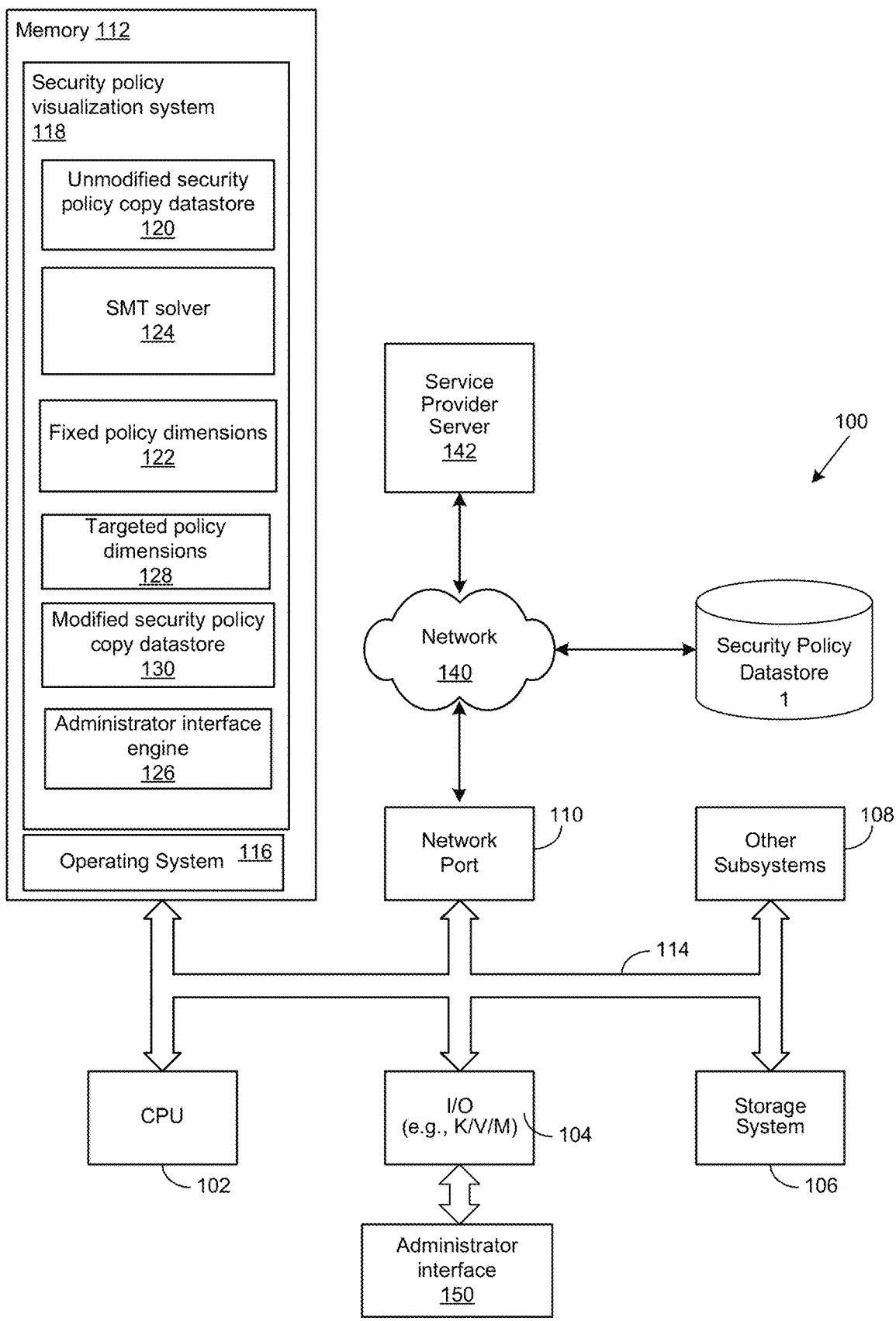
FIG. 1 depicts an exemplary client computer in which the disclosed system may be implemented.

A method, system, and computer-usable medium are disclosed for implementing a cybersecurity system having a unique security policy visualization system. To effectively implement a secured network, administrators often write a set of security policies in which individual policies are used that describe the intended security access rules relating to the IT assets of an organization. In certain systems, the policy syntax is expressive to allow flexibility in the policies. This expressiveness can include many different fields, precedence in expressing rules, etc.

Certain embodiments of the disclosed system are implemented with the recognition that the expressiveness and complexity of a subset of security policies make it difficult for policy administrators to understand how rules interact. Also, certain embodiments of the disclosed system are implemented with the recognition that many security breaches come from this misunderstanding. Further, certain embodiments of the disclosed system are implemented with an understanding that security administrators are often hesitant to make changes to the security policy or duplicate portions of policy because of fear of breaking another part of the policy.

Certain embodiments of the disclosed system use advances in formal logic software, such as Satisfiability Modulo Theory solvers (e.g., Z3 solver) to perform analysis of a security policy and present the administrator with a simplified view of the policy effects in an understandable manner at a user interface. The administrator can use the presentation at the user interface to understand an existing policy and, in certain embodiments, to understand the impact of any policy changes.

Although the disclosed system is described in the context of network policies, it will be recognized in view of the teachings of the present disclosure that this approach is applicable to other policy languages (DLP, etc.).

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a trackpad, a touchscreen and a display device (including a touch-sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid-state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes an operating system (OS) 116 and, in various embodiments, may also include a security policy visualization system 118. In one embodiment, the information handling system 100 can download the security policy visualization system 118 from the service provider server 142. In another embodiment, the security policy visualization system 118 is provided as a service from the service provider server 142.

In various embodiments, the security policy visualization system 118 performs a security protection operation. In certain embodiments, the security policy visualization system 118 improves the efficiency of the information handling system 100, by facilitating security policy visualization including, in certain embodiments, facilitating security policy modification visualizations. In certain embodiments, the security policy visualization system 118 provides a way of protecting a network system against security threats, thereby enhancing the operation of the network. As will be appreciated, once the information handling system 100 is configured to perform the disclosed security visualization operations, the information handling system 100 becomes a specialized computing device specifically configured to protect the information handling system 100 and/or a network connected to the information handling system 100 against security threats and is not a general-purpose computing device. The implementation of the security policy visualization system 118 on the information handling system 100 improves the functionality of the information handling system 100, providing a useful and concrete result of performing security analytics functions to mitigate security risk.

In certain embodiments, the security policy visualization system 118 includes components that are used to perform an analysis of a set of security policies and present the administrator with a simplified view of the effects of the policies. The administrator can use the simplified view to understand an existing set of security policies and to understand the impact of policy changes.

In the example shown in FIG. 1, the security policy visualization system 118 includes an unmodified security policy datastore 120. In certain embodiments, datastore 120 is configured to store rules of a security policy that is to be analyzed. In this example, datastore 120 is configured to hold a copy of the rules of an existing a security policy that, in certain embodiments, is currently active on a secured network.

The exemplary security policy visualization system 118 shown in FIG. 1 also includes memory for storing a satisfiability modulo theory (SMT) solver 124. In computer science, SMT is a decision problem for logical formulas with respect to combinations of background theories expressed in classical first-order logic with equality. In certain embodiments, SMT can be thought of as a form of constraint satisfaction problem and, thus, a certain formalized approach to constraint programming. In constraint programming, users declaratively state the constraints on the feasible solutions for a set of decision variables. Constraints differ from the common primitives of imperative programming languages in that they do not specify a step or sequence of steps to execute, but rather the properties of a solution to be found. Z3 is an SMT Solver available from Microsoft Research that may be used to implement certain embodiments of the disclosed system.

In certain embodiments, the administrator can interact with the security policy visualization system 118 through an administrator interface engine 126 that is configured to communicate with an administrator interface 150. In certain embodiments, the administrator interface 150 includes a display, a keyboard, mouse, or the like, which allow the administrator to enter information into the security policy visualization system 118. Further, certain embodiments of the administrator interface allow the administrator to view a simplified representation of the effects of the set of security policies in datastore 120.

In certain embodiments, a security policy may be represented as an N-dimensional space, where each N is a dimension of the policy. As an example, the dimensions of a network security policy may include source addresses, destination addresses, protocols, source ports, user groups, etc. In certain embodiments, the SMT solver 124 reduces the dimensions of the n-dimensional space so that simplified visualizations of the set of network policies may be displayed in terms of fixed policy dimensions 122 and targeted policy dimensions 128. In certain embodiments, the fixed policy dimensions 122 and targeted policy dimensions may be input by the administrator through the administrator interface 150. In certain embodiments, policy colors or other representative visual indicia are assigned to each region of the n-dimensional space with the appropriate action for that region. Certain embodiments, the SMT solver reduces high-dimension spaces down into easily visualized spaces where the administrator can see how the set of security policies operate.

Certain embodiments of the security policy visualization system 118 fix some values of the policy dimensions (e.g., the destination port) and find all policy rules that could apply the fixed values. Certain embodiments of the disclosed system are implemented with a recognition that the use of matching policy operations, without more, are difficult to execute using simple pattern matching because the effect of the rule set in the policy is cumulative. For example, a network policy rule set may have actions that implement conditions in which network access and/or traffic is to be passed or denied. A modification of a network policy rule may affect the results of later rules. Operations executed by the SMT solver 124 can be used to find actual combinations that will meet an access or traffic condition because the security policy visualization system 118 can create the actual logical relationships between the rules to evaluate the true policy effect using the SMT solver 124.

Certain embodiments of the security policy visualization system 118 may be configured to compare multiple sets of policies with one another. In the example shown in FIG. 1, the security policy visualization system 118 is configured to compare a copy of an unmodified security policy in datastore 120 with a copy of a modified security policy in datastore 130. In certain embodiments, the copy of the unmodified security policy corresponds to the set of security rules currently active in the secured network, while the copy of the modified security policy corresponds to a further set of rules that are being tested for potential implementation in the secured network. As an example, the further set of security rules may include a copy of the currently active policy rules along with modifications made by the administrator to the currently active roles. In this manner, the administrator may visualize how any modifications made to the currently active policy impacts the targeted dimensions for a given set of fixed dimensions. In certain embodiments, the target dimensions and fixed dimensions are predetermined. Additionally, or in the alternative, one or more of the target dimensions and/or fixed dimensions may be selected by the administrator through, for example, the administrator interface 150.

Figure 2:
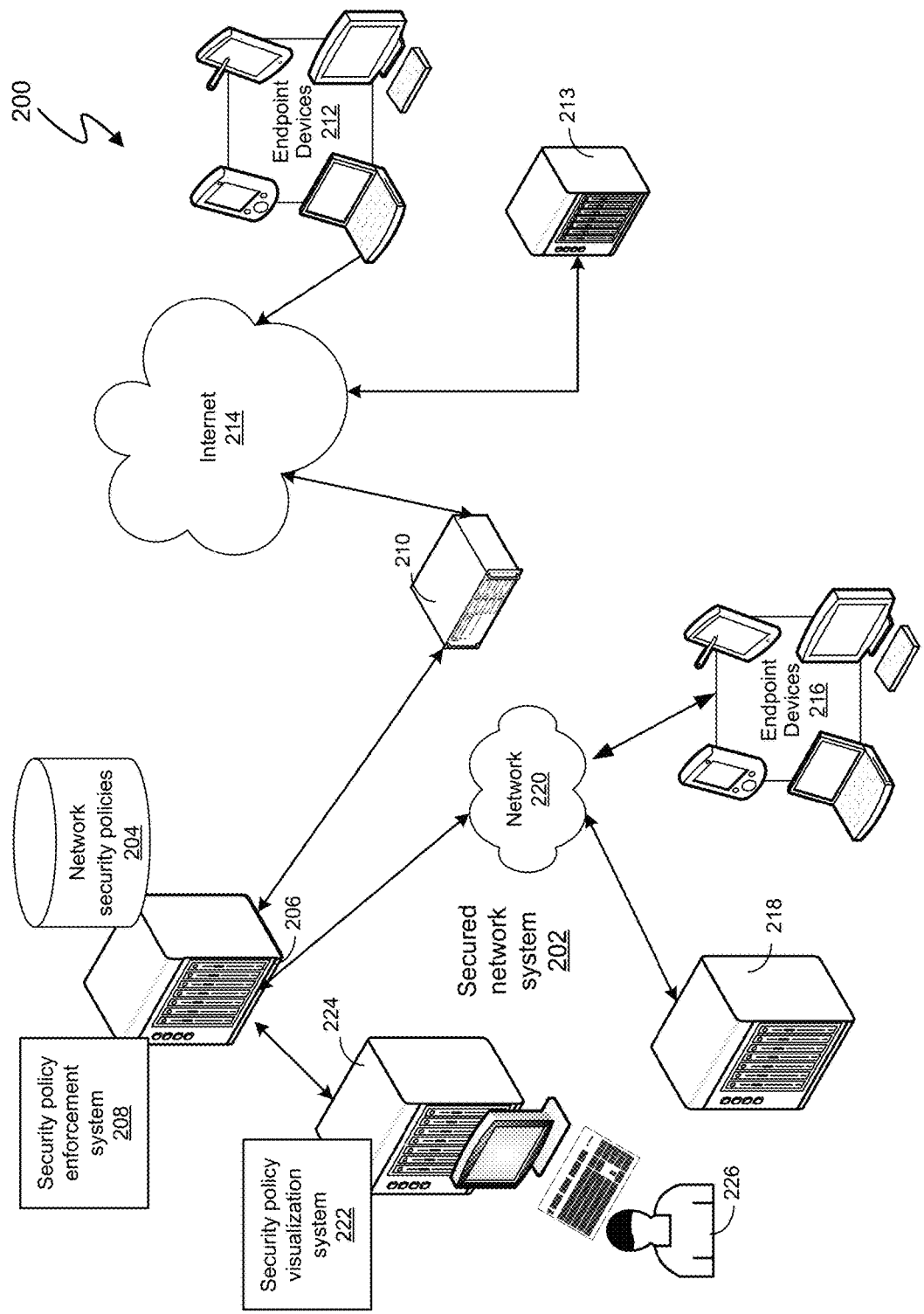
FIG. 2 shows an electronic environment in which certain embodiments of the disclosed system may operate.

FIG. 2 depicts an electronic environment 200 in which certain embodiments of the disclosed system may operate. As shown in the example of FIG. 2, the environment 200 includes a secured network 202. Network security policies 204 are stored for access by one or more servers 206 that implement a security policy enforcement system 208. In certain embodiments, an edge device 210 of the secured network 202 is also configured to enforce security policies.

In operation, endpoint devices 212 and server 213 are configured for communication with the secured network 202 over the Internet 214. In certain embodiments, endpoint devices 216 and server 218 communicate with one another over network 220 within secured network 202. Endpoint devices 216 and server 218, in certain embodiments, are configured to communicate with endpoint devices 212 and one or more servers 213 over the Internet 214 through the secured network 202.

Certain embodiments of the secured network 202 include a security policy visualization system 222 that, for example, is executed on a workstation 224 of a system administrator 226. In certain embodiments, the system administrator 226 can interface with the security policy visualization system 222 through the workstation 224. In turn, the security policy visualization system 222 provides a simplified view of the rules of the network security policies 204, as described herein.

Figure 3:
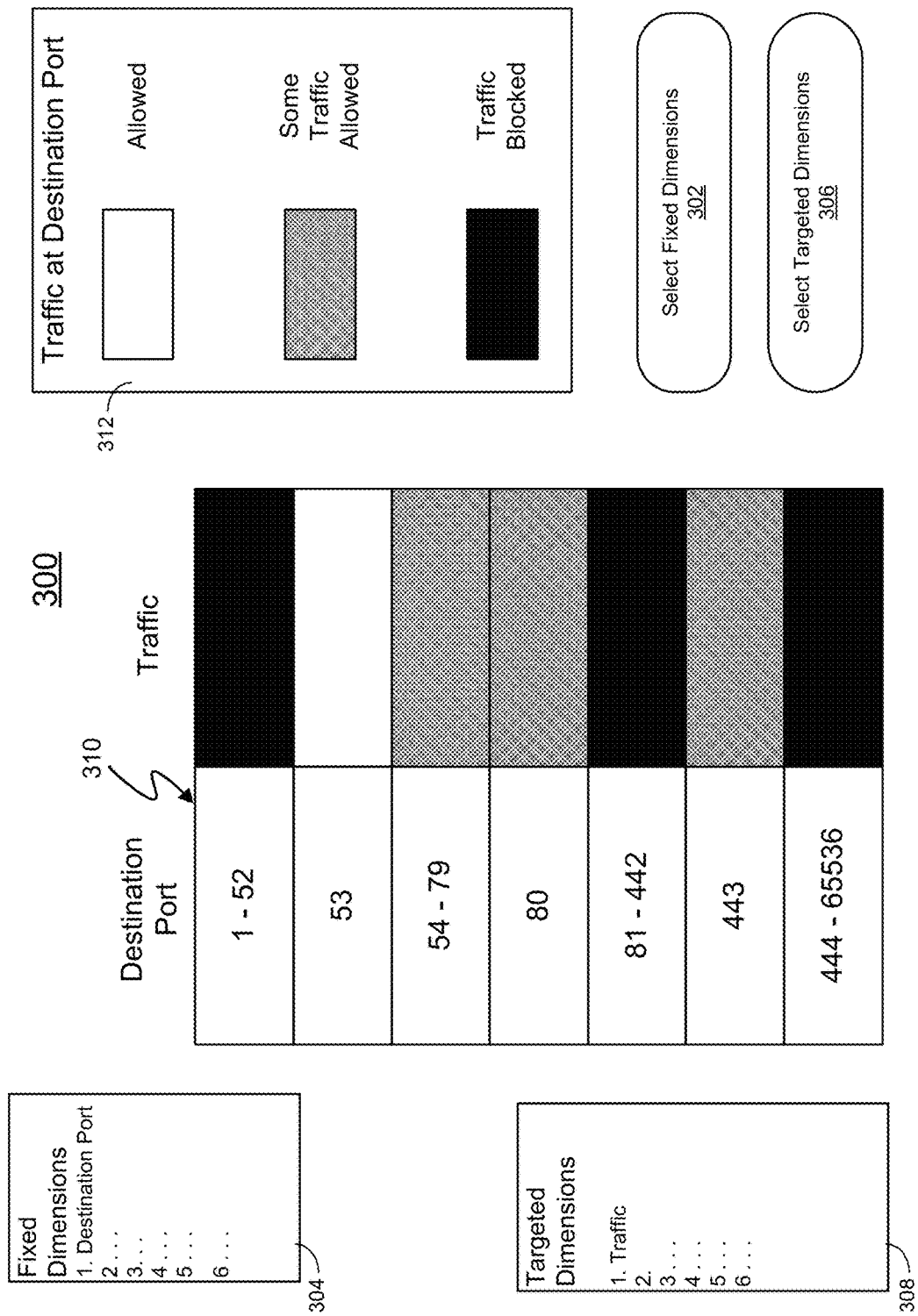
FIG. 3 depicts an exemplary display screen that may be employed in certain embodiments of the disclosed system.

FIG. 3 depicts an exemplary display screen 300 that may be employed in certain embodiments of the disclosed system. In this example, actuation of button 302 may be used to bring up a list of dimensions of the security policy that may be used as fixed dimensions for analysis. As shown at label object 304 of FIG. 3, the destination port has been selected as the fixed dimension. As also shown this example, actuation of button 306 may be used to bring up a list of dimensions of the security policy that may be used as targeted dimensions for analysis. As shown at label object 308 of FIG. 3, the traffic parameter has been selected as the targeted dimension.

The display screen 300 in this example shows a range of destination ports and the traffic rule for the destination ports. To this end, a table 310 is displayed in a central region of display screen 300, which displays the values of the fixed dimension (e.g., destination ports) in cells on a vertical axis, and the values of targeted dimension (e.g., traffic) in cells adjacent to the values for the fixed dimension. In certain embodiments, the traffic is displayed using cells having different colors, shades, and/or fill patterns. A legend, such as a legend shown at 312, may be provided on the display screen 300 to allow an administrator to understand the relationship between the destination ports and that the corresponding traffic rules at the destination ports.

Figure 4:
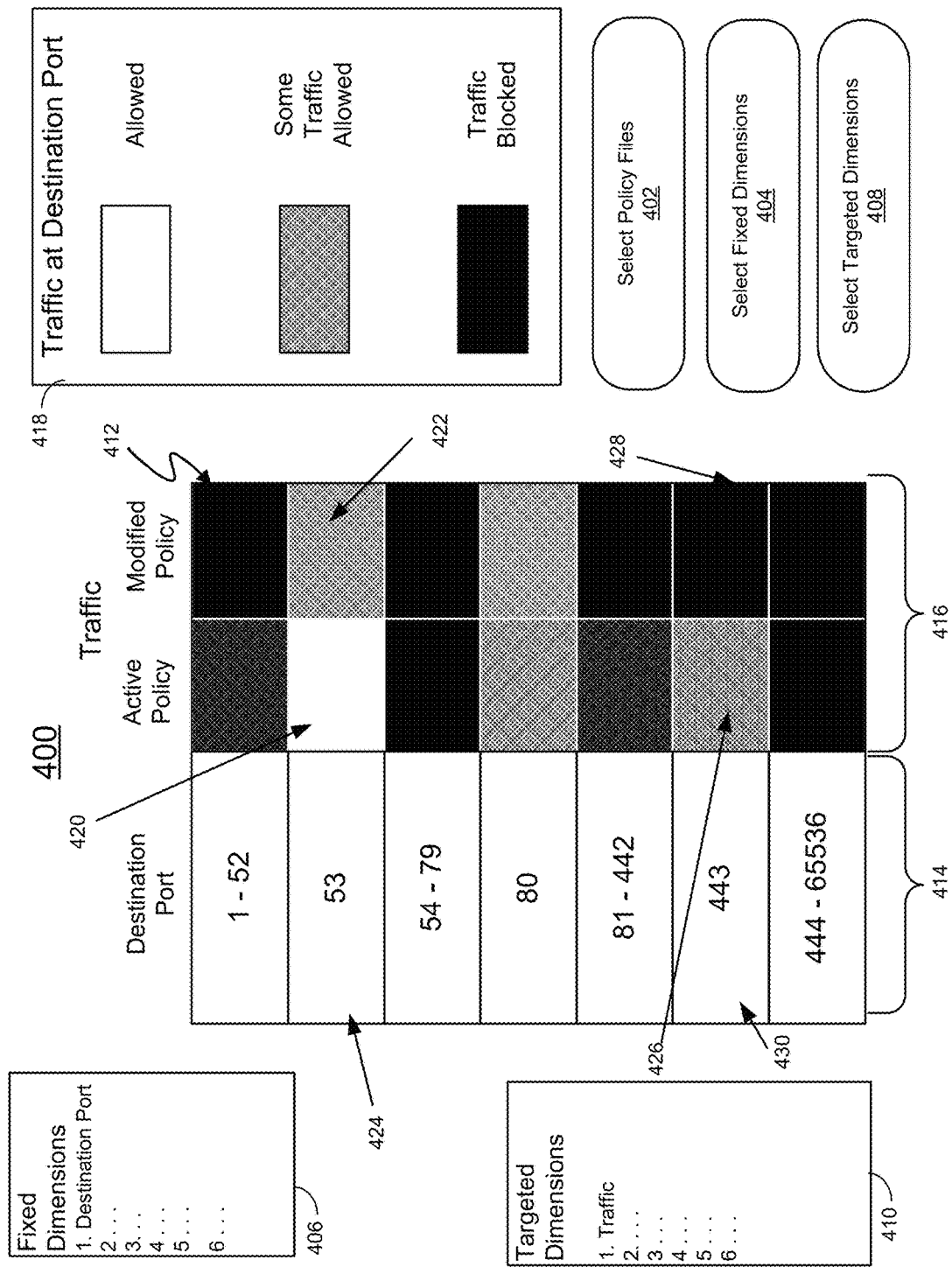
FIG. 4 depicts an exemplary display screen that may be employed in certain embodiments of the disclosed system.

FIG. 4 depicts an exemplary display screen 400 that may be employed in certain embodiments of the disclosed system. In this example, actuation of button object 402 may bring up a list of security policy files from which the administrator can select which security policy files will be subject to comparison. In certain embodiments, the selected security policy files may include a security policy file for the security policy that is active on the secured network. Further, in certain embodiments, the selected security policy files may include one or more modified security policy files, where the modified security policy includes modifications made to the active security policy. In FIG. 4, two security policy files are compared with one another, shown here as the Active Policy and the Modified Policy.

In this example, actuation of button 404 may be used to bring up a list of dimensions of the security policies that may be used as fixed dimensions in the comparative analysis. As shown at label object 406 of FIG. 4, the destination port has been selected as the fixed dimension. As also shown this example, actuation of button 408 may be used to bring up a list of dimensions of the security policies that may be used as targeted dimensions for the comparative analysis. As shown at label object 410 of FIG. 4, the traffic rule has been selected as the targeted dimension for the comparative analysis.

The display screen 400 in this example shows a range of destination ports and the traffic rules for the destination ports in each of the selected security policies. To this end, a table 412 is displayed in a central region of display screen 400, which displays the values of the destination ports (e.g., the fixed dimension) in a vertical column of cells 414 and the traffic rules (e.g., the targeted dimension) adjacent one another in cells of column 416 and, further, adjacent the cells having the values for the ports. In certain embodiments, the traffic rule is displayed using cells having different colors, shades, and/or fill patterns. A legend, such as a legend shown at 418, may be provided on the display screen 400 to allow an administrator to understand the relationship between the destination ports and the corresponding traffic rule allowed on the destination ports in the Active Policy and the Modified Policy.

In the example shown in FIG. 4, the differences between the traffic parameters of the Active Policy and Modified Policy occur at destination ports 53 and 443. As shown at cell 420, the Active Policy allows all traffic at destination port 53. In contrast, as shown at cell 422, the Modified Policy only allows some traffic at destination port 53. As shown at cell 426, the Active Policy allows some traffic at destination port 443, while the Modified Policy blocks all traffic at destination port 443, as shown in cell 428. Such differences may be difficult for an administrator to detect if the only tool the administrator has at their disposal involves a line-by-line analysis of the text of the Active Policy and Modified Policy. The restriction of traffic at destination port 53 may have been the desired result of the modifications thereby providing the administrator with a level of confidence that the modifications obtained the intended result. In other instances, the traffic limitations at destination port 53 may have been an unanticipated consequence of the modifications thereby allowing the administrator to re-evaluate modifications made in the Modified Policy. Similarly, blocking of all traffic at destination port 443 may have been the desired result of the modifications thereby providing the administrator with a level of confidence that the modifications obtained the intended result. In other instances, the blocking of all traffic at destination port 443 may have been an unanticipated consequence of the modifications thereby allowing the administrator to re-evaluate modifications made in the Modified Policy.

In certain embodiments, the cells in columns 416 may be button objects that are actuatable to display portions of the security policy files associated with the fixed dimension. As an example, actuation of a button object at cell 420 may transition to a screen showing all references to destination port 53 in the Active Policy, while actuation of button object at cell 422 may transition to a screen showing all references to rules referencing destination port 53 in the Modified Policy. As a further example, actuation of a button object at cell 430 may transition to a screen showing all rules referencing destination port 443 in the Active Policy, while the actuation of a button object at cell 428 may transition to a screen showing all rules referencing destination port 443. Additionally, or in the alternative, cell 424 may be a button object that transitions to a screen showing a side-by-side relationship of all rules referencing destination port 53 in both the Active Policy and Modified Policy. Similarly, cell 443 may be a button object that transitions to a screen showing a side-by-side relationship of all rules referencing destination port 443 in both the Active Policy and Modified Policy.

Figure 5:
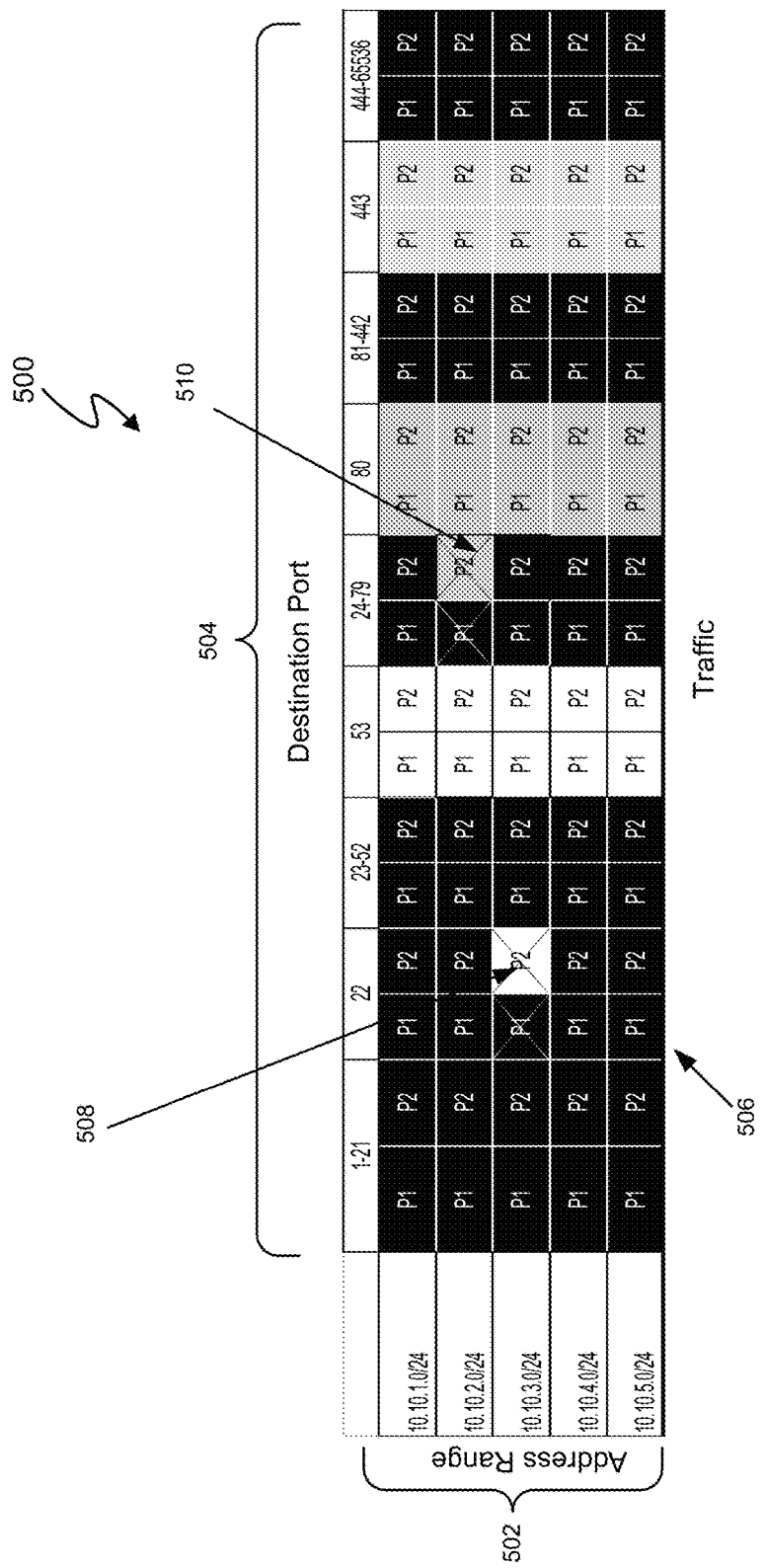
FIG. 5 depicts a screenshot of a table in which multiple fixed dimensions have been used with a single target dimension.

FIG. 5 depicts a screenshot of a table 500 in which multiple fixed dimensions have been used with a single target dimension. In this example, the table 500 includes a plurality of rows 502 respectively associated with a range of Internet Protocol addresses (e.g., the first fixed dimension), and a plurality of columns 504 respectively associated with a range of destination ports (e.g., the second fixed dimension). Traffic rules for the active policy P1 and modified policy P2 for the IP (Internet Protocol) address ranges at the destination ports are shown in the body of cells 506 of the table 500.

In the example shown in FIG. 5, the differences between the traffic rules of the Active Policy and Modified Policy occur at destination port 22 for the IP address range 10.10.3.0/24, and at destination port range 4-79 for IP address range 10.10.2.0/24. As shown in cell 508, the Modified Policy P2 allows all traffic in IP address range 10.10.3.0/24, while Active Policy P1 blocks all traffic at destination port 22 in IP address range 10.10.3.0/24. In this example, cell 508 includes a further visual indicator, shown here as an X through cell 508 to further draw the administrator's attention to the difference. Similarly, as shown at cell 510, the Modified Policy P2 allows some traffic in IP address range 10.10.2.0/24 at destination port range 24-79, while Active Policy P1 blocks all traffic in IP address range 10.10.2.0/24 at destination port 22. In this example, cell 510 includes a further visual indicator, shown here as an X through cell 508 to further draw the administrator's attention to the difference. As noted herein, the cells of the table 500 may be button objects that transition to various screens allowing the administrator to view portions of the security policies that reference the corresponding cell label. Such differences in the traffic rules shown in cells 506 of FIG. 5 may be difficult for an administrator to detect if the only tool the administrator has at their disposal involves a line-by-line analysis of the text of the Active Policy and Modified Policy. However, such differences are readily apparent in table 500.

In certain embodiments, the cells in table 500 may be button objects that are actuatable to display textual portions of the security policy files associated with the rules for the fixed dimensions and target dimension. As an example, actuation of a button object at cell 508 may transition to a screen showing all references to destination port 22 in the Modified Policy P2, while actuation of the button object adjacent the button object at cell 508 may transition to a screen showing all rules referencing destination port 22 in the Active Policy P1. Similar operations may be executed in response to the actuation of buttons in cells labeled with an address range seven as well as cells labeled with a destination port.

Figure 6:
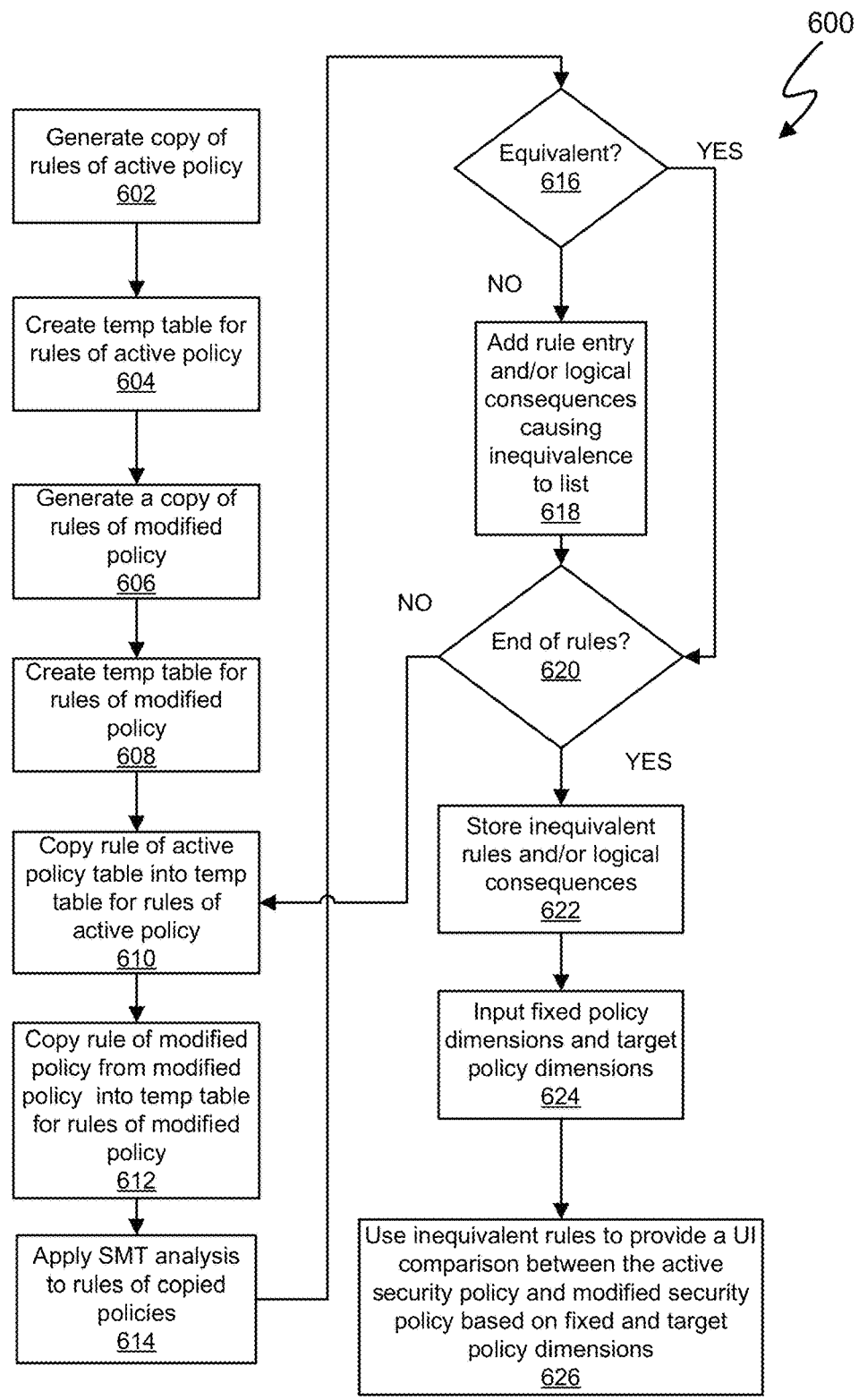
FIG. 6 shows a flowchart depicting exemplary operations that may be executed in certain embodiments of the disclosed system.

FIG. 6 shows a flowchart 600 depicting exemplary operations that may be executed in certain embodiments of the disclosed system. Although the operations are principally directed to a comparison of an active security policy with a modified security policy, the operations may be extended to a comparison of any of two or more security policies.

In the example of FIG. 6, the rules of the active policy are copied to a table at operation 602, and a temporary table for use in comparing the rules of the active policy with the rules of the modified policy is created at operation 604. Similarly, rules of the modified policy are copied at operation 606, and a temporary table for use in comparing the rules of the active policy with the rules of the modified policy is created at operation 608.

At operation 610, certain embodiments copy a rule of the active policy from the copy of the active policy to the temporary table for the rules of the active policy. At operation 612, a rule of the modified policy is copied from the copy of the modified policy into the temporary table for the rules of the modified policy. At operation 614, an SMT analysis is used to compare the rules copied to the temporary tables with one another. In some embodiments, the syntax of the copied rules may be different but have the same logical consequences. SMT analysis allows policy rules to be compared with one another based on the logic of the rules rather than the syntax. Based on the SMT analysis, a check is made at operation 616 to determine whether the rule copied in the temporary table for the active security policy and the rule copied into the temporary table for the modified security policy are logically equivalent. If the rules are not equivalent, the rules and/or logical difference between the rules are stored in a list at operation 618.

Operation 620 is executed to determine whether there are further rules of the active security policy and modified security policy that are to be compared with one another. If the rules are equivalent as determined at operation 616, the operational flow may proceed to operation 620 to determine whether there are further rules of the active security policy and modified security policy that are to be compared. If more rules are to be compared, the next rule of the active security policy and the next rule of the modified security policy are retrieved and compared in the manner shown at operations 610 through 618. If there are no more rules that are to be compared as determined at operation 620, the list having the inequivalent rules and/or logical consequences of the inequivalent rules may be finalized at operation 622.

At operation 624, the fixed policy dimensions and target policy dimensions are input by, for example, an administrator. At operation 626, the inequivalent rules and/or logical consequence of the inequivalent rules are used to provide a user interface providing a simplified view of the differences between the active security policy and modified security policy using the fixed policy dimensions, and target policy dimensions entered at operation 624.

As will be appreciated by one skilled in the art, the disclosed system may be embodied as a method, system, or computer program product. Accordingly, embodiments of the disclosed system may be implemented entirely in hardware, entirely in software (including firmware, resident software, micro-code, etc.) or in an embodiment combining software and hardware. These various embodiments may all generally be referred to herein as a "circuit," "module," or "system." Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object-oriented programming language such as Java, Smalltalk, C++ or the like. However, the computer program code for carrying out operations of the disclosed system may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed system. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the disclosed system have been shown and described, it will be evident to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation, no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The disclosed system is well adapted to attain the advantages mentioned as well as others inherent therein. While the disclosed system has been depicted, described, and is defined by reference to particular embodiments of the disclosed system, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for implementing security policies in a secured network, comprising:
    retrieving a set of rules of a security policy, the set of rules of the security policy being used when an individual accesses and uses assets and resources of an organization, the set of rules of the security policy describing intended security access rules relating to information technology (IT) assets of the organization, the security policy being used to deal with potential security risks to the IT assets;
    analyzing the set of rules of the security policy using one or more Satisfiability Modulo Theory (SMT) operations to reduce a dimensionality of the security policy;
    generating a visual presentation on a user interface using results of the SMT operations, where the visual presentation includes visual indicia representing one or more targeted policy dimensions with respect to one or more fixed policy dimensions
    retrieving a further set of rules of a further security policy;
    analyzing the set of rules and the further set of rules to identify one or more rules of the further security policy that are not equivalent to one or more rules of the security policy; and
    generating a visual presentation on a user interface showing an impact of differences between the rules of the security policy and the rules set of the further security policy with respect to one or more targeted policy dimensions and one or more fixed policy dimensions.

2. The computer-implemented method of claim 1, further comprising wherein:
    the visual presentation includes a representation of how one or more of the security policy and the further security policy treat traffic at a destination port of the one or more of the security policy and the further security policy.

3. The computer-implemented method of claim 2, wherein:
    the targeted policy dimensions for the security policy and targeted dimensions for the further security policy are displayed generally adjacent to one another to facilitate a visual comparison of the rules of the security policy and rules of the further security policy.

4. The computer-implemented method of claim 2, wherein:
    the security policy is a security policy currently implemented in the secured network; and
    the further security policy comprises a modified version of the security policy proposed for implementation in the secured network.

5. The computer-implemented method of claim 4, wherein:
    the rules of the security policy and rules of the further security policy comprise network security rules.

6. The computer-implemented method of claim 5, wherein:
    the one or more fixed policy dimensions include a destination port or Internet Protocol (IP) address; and
    the one or more targeted policy dimensions include one or more traffic policies for the one or more fixed policy dimensions.

7. The computer-implemented method of claim 1, wherein:
    the visual presentation comprises a table displaying one or more fixed dimensions on corresponding table axes and displaying one or more targeted dimensions within the table as a function of the one or more fixed dimensions.

8. A system comprising:
    one or more information handling systems, wherein the one or more information handling systems include:
        a processor;
        a data bus coupled to the processor; and
        a non-transitory, computer-readable storage medium embodying computer program code, the non-transitory, computer-readable storage medium being coupled to the data bus;
    wherein the computer program code included in one or more of the information handling systems is executable by the processor of the information handling system so that the information handling system, alone or in combination with other information handling systems, executes operations comprising:

retrieving a set of rules of a security policy, the set of rules of the security policy being used when an individual accesses and uses assets and resources of an organization, the set of rules of the security policy describing intended security access rules relating to information technology (IT) assets of the organization, the security policy being used to deal with potential security risks to the IT assets;

analyzing the set of rules of the security policy using one or more Satisfiability Modulo Theory (SMT) operations to reduce a dimensionality of the security policy;

generating a visual presentation on a user interface using results of the SMT operations, where the visual presentation includes visual indicia representing one or more targeted policy dimensions with respect to one or more fixed policy dimensionsi retrieving a further set of rules of a further security policy;

analyzing the set of rules and the further set of rules to identify one or more rules of the further security policy that are not equivalent to one or more rules of the security policy; and generating a visual presentation on a user interface showing an impact of differences between the rules of the security policy and the rules set of the further security policy with respect to one or more targeted policy dimensions and one or more fixed policy dimensions.

9. The system of claim 8, wherein:
the visual presentation includes a representation of how one or more of the security policy and the further security policy treat traffic at a destination port of the one or more of the security policy and the further security policy.

10. The system of claim 9, wherein:
the targeted policy dimensions for the security policy and targeted dimensions for the further security policy are displayed generally adjacent to one another to facilitate a visual comparison of the security policy and further security policy.

11. The system of claim 9, wherein:
the security policy is a security policy currently implemented in a secured network; and
the further security policy comprises a modified version of the security policy proposed for implementation in the secured network.

12. The system of claim 11, wherein:
the rules of the security policy and rules of the further security policy comprise network security rules.

13. The system of claim 12, wherein:
the one or more fixed policy dimensions include a destination port or Internet Protocol (IP) address; and
the one or more targeted policy dimensions include one or more traffic policies for the one or more fixed policy dimensions.

14. The system of claim 8, wherein:
the visual presentation comprises a table displaying one or more fixed dimensions on corresponding table axes and displaying one or more targeted dimensions within the table as a function of the one or more fixed dimensions.

15. A non-transitory, computer-readable storage medium embodying computer program code, the computer program code comprising computer-executable instructions configured for:

retrieving a set of rules of a security policy, the set of rules of the security policy being used when an individual accesses and uses assets and resources of an organization, the set of rules of the security policy describing intended security access rules relating to information technology (IT) assets of the organization, the security policy being used to deal with potential security risks to the IT assets;

analyzing the set of rules of the security policy using one or more Satisfiability Modulo Theory (SMT) operations to reduce a dimensionality of the security policy;

generating a visual presentation on a user interface using results of the SMT operations, where the visual presentation includes visual indicia representing one or more targeted policy dimensions with respect to one or more fixed policy dimensions retrieving a further set of rules of a further security policy;

analyzing the set of rules and the further set of rules to identify one or more rules of the further security policy that are not equivalent to one or more rules of the security policy; and generating a visual presentation on a user interface showing an impact of differences between the rules of the security policy and the rules set of the further security policy with respect to one or more targeted policy dimensions and one or more fixed policy dimensions.

16. The non-transitory, computer-readable storage medium of claim 15, wherein
the visual presentation includes a representation of how one or more of the security policy and the further security policy treat traffic at a destination port of the one or more of the security policy and the further security policy.

17. The non-transitory, computer-readable storage medium of claim 16, wherein:
the targeted policy dimensions for the security policy and targeted dimensions for the further security policy are displayed generally adjacent to one another to facilitate a visual comparison of the security policy and further security policy.

18. The non-transitory, computer-readable storage medium of claim 16, wherein:
the security policy is a security policy currently implemented in a secured network; and
the further security policy comprises a modified version of the security policy proposed for implementation in the secured network.

19. The non-transitory, computer-readable storage medium of claim 18, wherein:
the rules of the security policy and rules of the further security policy comprise network security rules.

20. The non-transitory, computer-readable storage medium of claim 19, wherein:
the one or more fixed policy dimensions include a destination port or Internet Protocol (IP) address; and
the one or more targeted policy dimensions include one or more traffic policies for the one or more fixed policy dimensions.

* * * * *